United States Patent [19]

Carmichael

[11] 4,103,723
[45] Aug. 1, 1978

[54] TREE HARVESTING BLADE

[76] Inventor: William Earl Carmichael, 2592 McBride Crescent, Prince George, British Columbia, Canada, V2M 2A1

[21] Appl. No.: 812,606

[22] Filed: Jul. 5, 1977

[51] Int. Cl.² .................. A01G 23/08; A47J 49/02
[52] U.S. Cl. .......................... 144/34 E; 144/34 F; 144/193 A; 144/193 D; 83/694; 254/104
[58] Field of Search ............ 144/2 N, 2 Z, 3 D, 34 R, 144/34 E, 34 F, 309 AC, 312, 193 R, 193 A, 193 D, 218; 254/104; 83/694

[56] References Cited

U.S. PATENT DOCUMENTS

| 3,270,787 | 9/1966 | Rehnstrom | 144/34 E |
|---|---|---|---|
| 3,720,249 | 3/1973 | Peltonen | 144/34 E |
| 3,837,382 | 9/1974 | Gaitten | 144/34 E |
| 3,918,476 | 11/1975 | Jasinski | 144/34 E |
| 3,986,541 | 10/1976 | McLauchlan | 144/34 E |
| 4,057,087 | 11/1977 | Oldenbung | 144/34 E |

*Primary Examiner*—Othell M. Simpson
*Assistant Examiner*—W. D. Bray
*Attorney, Agent, or Firm*—Carver and Company

[57] ABSTRACT

Tree shear blade having a forwardly tapering web portion and upper and lower rib portions provided on upper and lower web faces of the web portion. Cutting edge of web portion is defined as intersection of a lower bevelled face thereof with the upper web face. Upper rib portions are spaced along the blade and extend upwardly from upper web face and rearwardly from cutting edge with leading ends thereof having leading faces extending rearwardly from the cutting edge. Lower rib portions extending downwardly from lower web face and having leading ends with inclined rib leading faces extending rearwardly from and being coplanar with lower bevelled face. Upper and lower rib portions are both generally staggered relative to each other along the blade adajcent upper and lower rib portions so that outer portions of rib portions overlap each other to strengthen blade. Inclined lower bevelled face tends to direct shearing damage to stump of tree and away from butt of tree thus reducing losses resulting from splitting of tree. Blade is sharpened by grinding back lower bevelled face of web portion and occassionally leading edges of upper rib portions.

10 Claims, 9 Drawing Figures

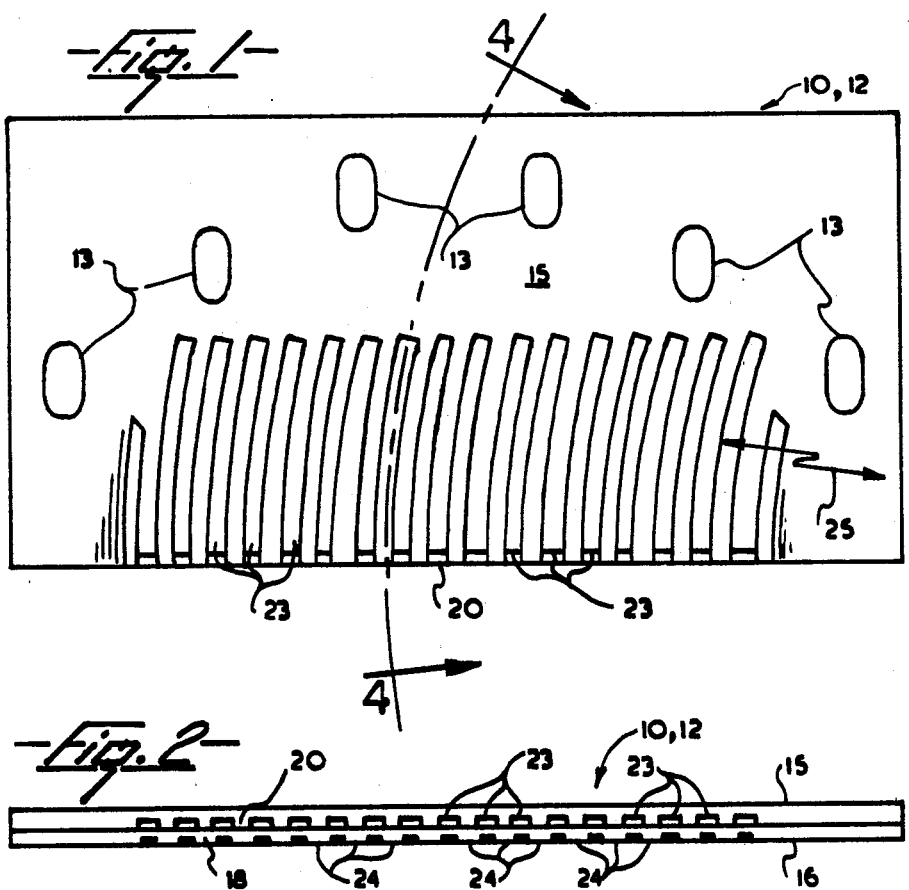
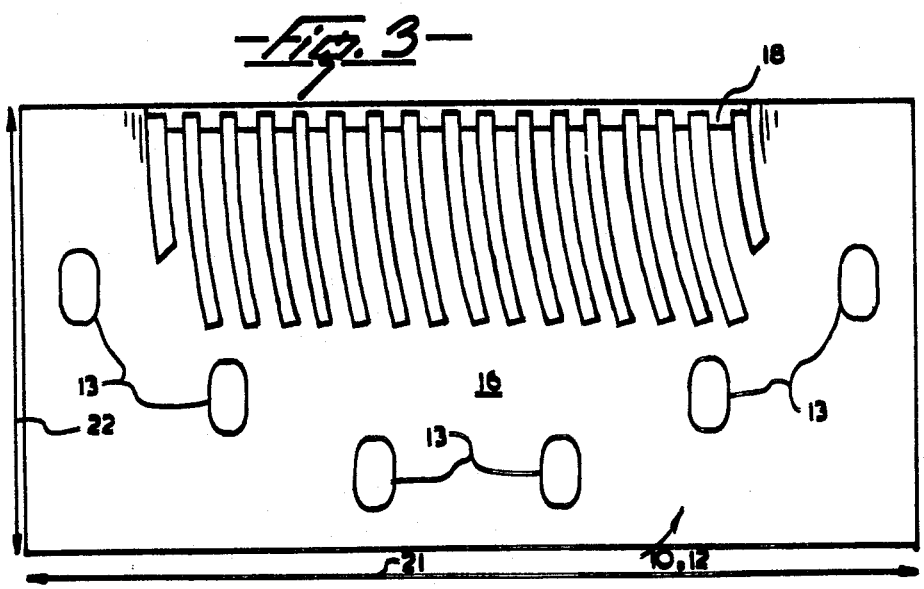

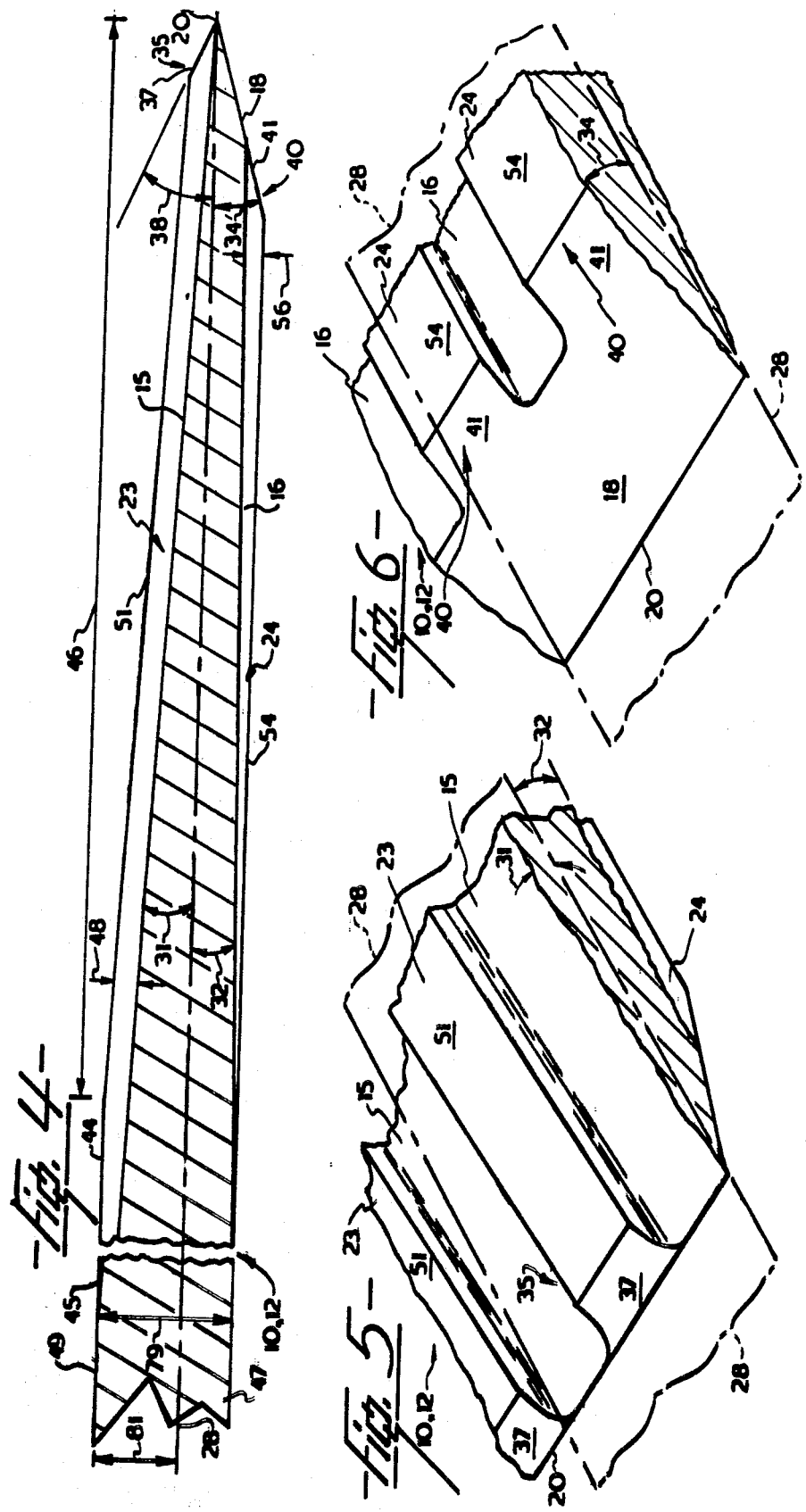

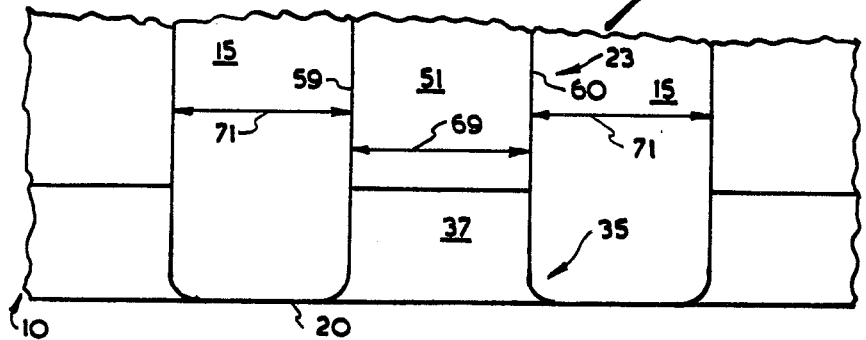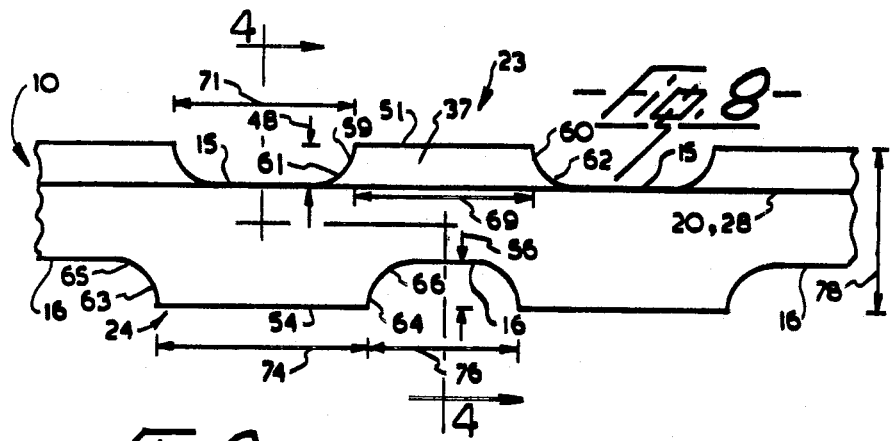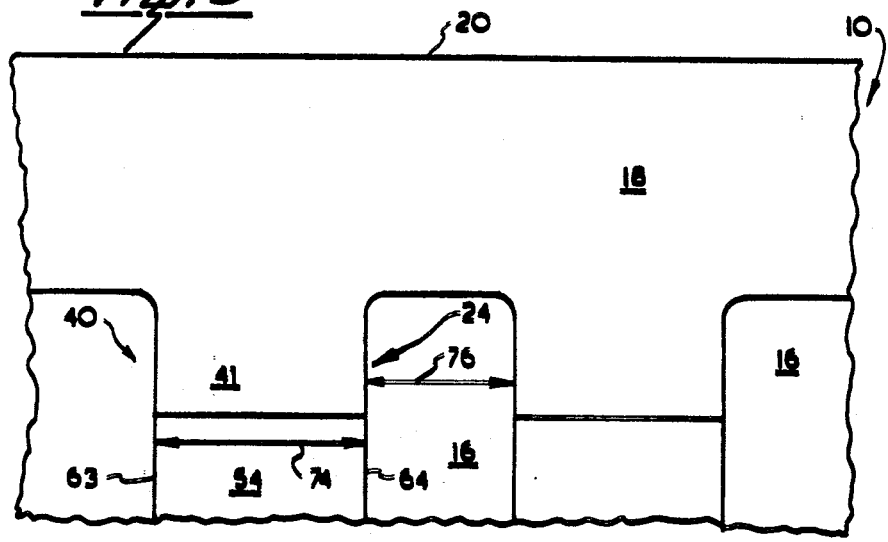

TREE HARVESTING BLADE

BACKGROUND OF THE INVENTION

1. Field of the Invention

The invention relates to a tree shear blade or cross-cut blade as used in a mechanical tree felling device.

2. Prior Art

Tree felling devices using shear or cross-cut blades are old and can be divided into two main types. One type is a "feller buncher" in which two similar blades are mounted on a scissor-like mechanism used primarily by a carrier with a hydraulically operated boom. The two blades close simultaneously by hinging about a pivot point and sever the tree which is held by clamps or grapples. The second type is a single blade cutter which is commonly mounted on a crawler- or loader-type carrier. The single blade is generally thicker than the scissor type blade and is commonly designed to cause a tree to fall in a particular direction for later gathering.

Both types of shear blades as above identified commonly cause splitting or crushing damage to severed trees far in excess of what would be anticipated by normal falling when using an ax or chain saw. The splitting tends to run longitudinally from the cut and up the butt of the tree, sometimes extending six to ten feet up the butt, depending on the species and condition of the tree. This splitting tendency of the tree is well known and many attempts have been made to reduce the splitting. To reduce the amount of wood that is compressed when the blade severs the tree, blades have been made thinner but such blades are mechanically weak. Sometimes the thin blades are strengthened by ribs on a surface of the blade but, to the inventor's knowledge, these ribbed thin blades have not reduced the splitting tendency appreciably. One such attempt to strengthen thin blades is disclosed in Canadian Pat. No. 980,664, inventor Thomas A. McLaughlan, and, whilst this blade has a tendency to reduce splitting when compared with earlier shear blades, according to some authorities, this blade still causes more damage to trees than would be expected with chain saw or ax felling techniques.

SUMMARY OF THE INVENTION

The present invention reduces some of the difficulties and disadvantages of the prior art by providing a thin blade stiffened with ribs on both upper and lower surfaces. The ribs are staggered along the blade to attempt to reduce displacement of wood as the blade enters the tree, and the blade has an assymmetrical cutting edge to direct the fall of the tree.

A tree shear blade according to the invention is characterized by a web portion and a plurality of upper and lower rib portions. The web portion has upper and lower web faces, a datum plane, a lower bevelled face and a cutting edge, the cutting edge being defined by intersection of the lower bevelled face with the upper web face at the datum plane of the web portion. The upper rib portions are similar and are spaced along the blade and extend upwardly from the upper web face and rearwardly from the cutting edge. Each upper rib portion is generally rectangular in cross-section and has a leading end having an inclined rib leading face extending rearwardly from the cutting edge. The lower rib portions are similar and are spaced along the blade and extend downwardly from the lower web face and rearwardly from the lower bevelled face. Each lower rib portion is generally rectangular in cross-section and has a leading end having an inclined rib leading face extending rearwardly from, and being coplanar with, the lower bevelled face. The lower rib portions are generally staggered relative to the upper rib portions along the blade.

A detailed disclosure following, related to the drawings, describes a preferred embodiment of the invention which is capable of expression in structure other than that particularly described and illustrated.

DESCRIPTION OF THE DRAWINGS

FIG. 1 is a top plan of a shear blade according to the invention,

FIG. 2 is a front elevation looking at a cutting edge,

FIG. 3 is a bottom plan of the blade of FIG. 1,

FIG. 4 is a fragmented staggered section following sweep of blade, substantially according to line 4—4 of FIG. 1, and as shown generally by line 4—4 of FIG. 8, FIG. 5 is a simplified fragmented isometric sketch of an upper portion of a leading edge of the blade, FIG. 6 is a simplified fragmented isometric sketch of a lower portion of the leading edge of the blade, FIG. 7 is a detailed fragmented top plan of the upper portion of the leading edge of the blade, FIG. 8 is a detailed front elevation of a portion of the leading edge of the blade, some portions being omitted, FIG. 9 is a detailed fragmented bottom plan of a portion of the leading edge of the blade.

DETAILED DISCLOSURE

FIGS. 1 through 3

A tree shear blade 10 according to the invention has a web portion 12 having a plurality of slots 13 for securing to a felling apparatus (not shown), which moves the blade through an arc for shearing a tree. The web portion has upper and lower web faces 15 and 16, a lower bevelled face 18, and a cutting edge 20, the structure adjacent the cutting edge being particularized with reference to FIGS. 4 through 9. The blade has a length 21, usually between about 50 cms and 90 cms and a width 22, usually between about 25 cms and 45 cms.

The blade has a plurality of similar upper rib portions 23 spaced along the blade and extending upwardly from the upper web face 15 and rearwardly from the cutting edge. The blade also has a plurality of similar lower rib portions 24 spaced along the blade and extending downwardly from the lower web face and rearwardly from the lower bevelled face. The rib portions are arcuate in plan so as to be concentric about a center (not shown) about which the blade swings to effect severing of a tree. Thus each rib portion has a rib arc radius, e.g. 25, which differs slightly from adjacent rib radii. Thus as the blade swings, each rib portion follows sweep of the blade at its particular arc radius. Apart from the arc radii, the rib portions on a particular face of the web are essentially equal and thus one rib on each face only will be described in detail.

FIGS. 4 through 9

Referring particularly to FIGS. 4 through 6, the blade has a datum plane 28 within the blade positioned so that the cutting edge 20 is defined by intersection of the lower bevelled face 18 with the upper web face 15 at the datum plane of the web. The web portion is forwardly tapered and the upper and lower faces are inclined to the datum plane of the web portion at angles 31 and 32 respectively. The angle 31 is shown as approximately 3° but can be between 1° and 10° depending on parameters as will be discussed. The angle 32 is shown as approximately 1° but can be between 0.5° and 5°. The lower bevelled face 18 is inclined to the datum plane 28 of the web portion at an angle 34 which is shown as 15° but can be between about 10° and 30°.

The upper rib portion 23 has a leading end 35 having a plane rearwardly inclined rib leading face 37 inclined to the datum plane at an angle 38. The angle 38 is shown as 24° but can be between 15° and 30°. The lower rib portion 24 has a leading end 40 having a rearwardly inclined rib leading face 41 extending rearwardly from and being coplanar with the lower bevelled face 18 and is also inclined to the datum plane at the angle 34. The angles specified above depend mainly on cutting parameters, wood condition and species, and in some circumstances angles outside the ranges specified may be practical.

The upper rib portion 23 extends from the leading end 35 to a rear end 45 adjacent a rear portion 47 of the web portion 12. The rear end 45 of the portion 23 is bevelled and merges smoothly with a rear upper face 49 of the web, which face is parallel to the datum plane 28. The rib has an upper surface 51 and, for a major portion 46 of its length from the leading face 37 to an upper bevelled face 44, the rib 23 has a substantially constant thickness 48, defined as spacing of the rib upper face 51 from the web upper face 15. Thus the rib upper surface 51 is spaced an equal distance from the web face 15 for the length of the ribs extending from the cutting edge 20 to the face 44 adjacent the rear portion 47. The thickness 48 is typically about 4.7 mms but can vary between 2 mms and 7 mms.

The lower rib portion 24 has a rib lower face 54 disposed parallel to the datum plane 28 of the web. The inclination of the lower web face results in the rib portion 24 converging rearwardly from the relatively thick leading end 40 to merge with the lower face of the web portion at a position approximately beneath the upper bevelled face 44 of the upper rib portion 23. The leading end 40 can have a thickness 56 of about 4 mms, but this can vary between 2 mms and 6 mms depending on the value of the angle 32 of the lower web face, the width of the blade, and other factors.

Referring to FIGS. 7, 8 and 9, the upper rib portion 23 has generally parallel side faces 59 and 60 when viewed in cross-section with fillets 61 and 62 blending smoothly from the side faces into adjacent portions of the upper web face 15. Similarly the lower rib portion 24 has generally parallel side faces 63 and 64 with fillets 65 and 66 blending smoothly from the side faces into adjacent portions of the lower web face 16. For both upper and lower rib portions, the fillets are shown to have fillet radii substantially equal to respective thicknesses of the rib portions, but a reasonable range of fillet radii would be practical.

The upper rib portion 23 has a first width 69 defined as space between the side edges 59 and 60, and is spaced laterally along the blade from adjacent upper rib portions at a first spacing 71 which is equal to the first width. All the upper rib portions have equal first widths and are spaced laterally from each other along the blade at the first spacing. The first width 69 and first spacing 71 are both about 19 mms but can be between 15 mms and 25 mms.

The lower rib portion 24 has a second width 74 defined as space between the side faces 63 and 64, and is spaced laterally from adjacent lower rib portions at a second spacing 76. All the lower rib portions have equal second widths and are spaced laterally from each other along the blade at the second spacing. The second width 74 is about 22 mms but can be between 17 mms and 30 mms depending on the first width. The second spacing 76 is about 16 mms but can be between 12 mms and 22 mms depending on the first width. A major factor determining the relative differences between the first and second spacings and widths is that the second width 74 of the lower rib portions is greater than the first width 69 of the upper rib portions, and that the second spacing 76 is less than the first spacing 71, so that the side faces of the upper rib portions are displaced laterally relative to the side faces of the adjacent lower rib portions. Thus outer margins of adjacent upper and lower rib portions overlap slightly so that at particular locations along the shear blade the shear blade has an overall thickness 78 of combined thicknesses of the web and the upper and lower rib portions. When used as a single shear blade, the blade has a root thickness 79 of 19 mms, adjacent the rear portion of the blade and in such a blade the datum plane 28 is spaced from the rear upper face 49 at a plane spacing 81 of about 15 mms, but the spacing 81 can be between 12 mms and 16 mms.

It can be seen that the rib leading face 37 of the upper rib portion 23 cooperates with an immediately adjacent portion of the cutting edge 20, thus forming a double facetted chisel point, one of the facets being the face 37 and the other facet being a portion of the bevelled face 18. This contrasts with the rib leading face 41 of the lower rib portion 24, because the face 41 forms a coplanar continuation of the bevelled face 18, and thus the leading ends of the lower rib portions are remote from the cutting edge 20.

It has been found that, when using the present invention, splitting and compression damage to the portion of the tree immediately above the cut, i.e. the butt of the tree, is considerably less than that with prior art tree shears. Whilst the underlying causes of tree damage using any type of shear blade are not fully understood, the reduction in damage resulting from use of the present invention is attributed in part to the chiselled edged rib portions which have relatively short length facets on the upper surfaces thereof, and longer length facets on the lower surfaces. That is, relative to the datum plane 28 passing through the cutting edge 20, the lower portion of the blade below the datum plane is thicker than an upper portion, and the inclined bevelled face 18 appears to direct damage into the stump, rather than into the butt of the tree. Furthermore, the rib portions are integral stiffening bars which increase stiffness of the total shear blade to resist bending of the shear blade out of the datum plane 28. This permits the web to be thinner than otherwise would be practical without rib portions, thus reducing volume of steel forced into the tree. The upper and lower rib portions are generally rectangular in cross-section which provides greatest sectional modulus relative to bending for a given depth of bar with similar thickness, which increases stiffness of the blade when compared to a blade having a V-shaped or semi-cylindrical rib portions.

The present invention also reduces sharpening problems associated with many conventional shear blades. To sharpen the present invention, usually the bevelled face 18 and adjacent coplanar inclined lower rib leading faces 41 only are ground, thus sharpening the edge 20 formed at the intersection of the face 18 with the web upper face 15. After a while it may become necessary to grind back the rib leading faces 37 on the upper rib portions so as to maintain the cutting edge as a straight line.

OPERATION

The blades can be fitted to a conventional felling machine to which the trees are clamped prior to felling. The shear blade is secured to a scissor-like mechanism used primarily by a carrier with a hydraulically operated boom, such mechanism being referred to as a feller buncher. In such an arrangement, two similar blades are pivoted together so that arcs of the rib portions are concentric with the pivot point of the scissors. Thus as the blade sweeps through the arcs, each rib portion tracts in a groove in the end face of the butt or tree stump produced by the leading end face of that particular rib portion. Thus operation of the feller buncher follows normal procedure with a reduction of tree damage and simplification of sharpening.

ALTERNATIVES AND EQUIVALENTS

The blade as disclosed has a thickness adequate for a shear blade for felling soft wood trees of up to about 80 cms in diameter. Alternatively, a stronger embodiment of the same basic type of blade can be fitted to a tree cutter mechanism or tree shear which is commonly used as a single blade and is mounted on a crawler or loader type carrier. Such a blade is generally thicker, perhaps between about 2.5 cms and 3 cms, but nevertheless this blade alternative has a similar angle and spacings as described.

In the embodiment described, the upper rib portions and spaces between the rib portions are equal, and the lower rib portions are wider than the upper rib portions and spaces between the lower ribs are narrower than the width of the upper rib portions. This results in the staggering of the upper and lower rib portions causing the limited overlapping of the rib portions to strengthen the blade, which is of importance. In an alternative blade (not shown) the lower rib portions and spaces between the lower rib portions can be equal and the upper rib portions can be wider than the lower rib portions, and spaces between the upper rib portions can be narrower than the width of the lower rib portions. This alternative also results in limited overlapping of the rib portions and thus comes within the invention. Other alternative structures to produce the required overlapping can be devised. Clearly if the blade were to be used in a motion other than sweeping through an arc, the ribs would be of different shape compatible with the motion.

I claim:
1. A tree shear blade characterized by:
(a) a web portion having; upper and lower web faces, a datum plane, a lower bevelled face and a cutting edge, the cutting edge being defined by intersection of the lower bevelled face with the upper web face at the datum plane of the web portion,
(b) a plurality of similar upper rib portions spaced along the blade and extending upwardly from the upper web face and rearwardly from the cutting edge, each rib portion being generally rectangular in cross-section and having a leading end having an inclined rib leading face extending rearwardly from the cutting edge,
(c) a plurality of similar lower rib portions spaced along the blade and extending downwardly from the lower web face and rearwardly from the lower bevelled face, each lower rib portion being generally rectangular in cross-section and having a leading end having an inclined rib leading face extending rearwardly from and being coplanar with the lower bevelled face, the lower rib portions being generally staggered relative to the upper rib portions along the blade,
each rib portion being adapted to follow sweep of the blade.
2. A tree shear blade as claimed in claim 1 in which:
(a) the web portion is forwardly tapered and the upper and lower web faces are inclined to the datum plane of the web portion at angles of between 1° and 10°, and between 0.5° and 5° respectively.
3. A tree shear blade as claimed in claim 1 in which:
(a) the upper and lower rib portions have generally parallel side faces when viewed in cross-section with fillets blending smoothly from the side faces into adjacent portions of the upper and lower web faces respectively.
4. A tree shear blade as claimed in claim 1 in which:
(a) the lower bevelled face is inclined to the datum plane of the web portion at an angle of between 10° and 30°.
5. A tree shear blade as claimed in claim 1 in which:
(a) the rib leading faces of the upper rib portions are plane and inclined to the datum plane of the web portion at an angle of between 20° and 30°.
6. A tree shear blade as claimed in claim 1 in which:
(a) the upper rib portions have different widths than the lower rib portions and the side faces of the upper rib portions are displaced laterally relative to the side faces of the adjacent lower rib portions so that the outer portions of adjacent upper and lower rib portions overlap slightly,
so that at particular locations along the shear blade the shear blade has an overall thickness of combined thicknesses of the web and the upper and lower rib portions.
7. A tree shear blade as claimed in claim 1 in which:
(a) the upper web face is inclined to the datum plane at an angle of between 1° and 10°,
(b) the upper rib portions have a substantially constant thickness of between 2 mms and 7 mms.
8. A tree shear blade as claimed in claim 1 in which:
(a) the lower web face is inclined to the datum plane of the web at an angle of between 0.5° and 5°,
(b) the lower rib portions have rib lower faces disposed substantially parallel to the datum plane of the web portion so that lower faces of the lower rib portions converge rearwardly from a relatively thick leading end thereof to merge with the lower face of the web portion adjacent a rear portion thereof.
9. A tree shear blade as claimed in claim 1 in which:
(a) the upper rib portions have equal first widths and are spaced laterally from each other along the blade at a first spacing equal to the first width,
(b) the lower rib portions have equal second widths which are greater than the first widths of the upper rib portions, the lower rib portions being spaced laterally from each other along the blade at a second spacing which is less than the first spacing,
so that outer portions of adjacent upper and lower rib portions overlap slightly so that at particular locations along the shear blade the shear blade has an overall thickness of combined thicknesses of the web and the upper and lower rib portions.

10. A tree shear blade as claimed in claim 1 in which:
(a) the shear blade is used in combination with a complementary shear blade of similar structure so that the blades operate as a scissor shears swinging about a pivot point, the rib portions being arcuate and centered on the pivot point of the blades.

* * * * *